(12) United States Patent
Morgulis et al.

(10) Patent No.: US 6,709,205 B2
(45) Date of Patent: Mar. 23, 2004

(54) CUTTING TOOL AND CUTTING INSERT THEREFOR

(75) Inventors: Rafael Morgulis, Karmiel (IL); Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 10/270,509

(22) Filed: Oct. 16, 2002

(65) Prior Publication Data

US 2003/0072625 A1 Apr. 17, 2003

(30) Foreign Application Priority Data

Oct. 16, 2001 (IL) ................................................ 145965
Jul. 17, 2002 (IL) ................................................ 150783

(51) Int. Cl.[7] ................................................ B23C 5/02
(52) U.S. Cl. ........................ 407/113; 407/116; 407/40; 407/48
(58) Field of Search ............................ 407/40, 113, 43, 407/53, 51, 64, 114, 116, 46, 48, 30

(56) References Cited

U.S. PATENT DOCUMENTS

| | | | | |
|---|---|---|---|---|
| 3,946,475 A | * | 3/1976 | Hopkins ................... | 29/105 A |
| 5,658,100 A | * | 8/1997 | Deiss et al. ............... | 497/53 |
| 6,273,650 B1 | * | 8/2001 | Jordberg .................. | 407/64 |
| 6,508,612 B1 | * | 1/2003 | Baca ....................... | 407/113 |

* cited by examiner

Primary Examiner—Willmon Fridie, Jr.
(74) Attorney, Agent, or Firm—Womble Carlyle

(57) ABSTRACT

A cutting tool having replaceable indexable cutting insert retained in insert pockets. Each insert pocket has a base wall and first and second rear sidewall sections. A generally circular recess having a peripheral wall extends downwardly from the base wall. The cutting insert comprises an upper surface, a side surface and a lower surface from which a cylindrical protrusion extends downwardly. A first abutment surface located on the first rear sidewall section abuts a first support surface located on the side surface of the cutting insert, a second abutment surface located on the second rear sidewall section abuts a second support surface located on the side surface of the cutting insert, and a third abutment surface located on the peripheral wall of the recess abuts a third support surface located on the cylindrical protrusion of the cutting insert.

29 Claims, 4 Drawing Sheets

CUTTING TOOL AND CUTTING INSERT THEREFOR

FIELD OF THE INVENTION

The present invention relates to a cutting tool and particularly to a milling cutting tool capable of performing face milling operations at a high feed rate and a long tool shank. The invention also discloses an indexable cutting insert for use with the cutting tool.

BACKGROUND OF THE INVENTION

Japanese Publication No. 2000202703 A to Masaharu discloses a boring tool having two identical nearly parallelogrammatic plate form tips. Each tip has a pair of first cutting edges 15 and a pair of second cutting edges 16 arranged in a rotational symmetry and connected via a nose part 17. The first cutting edge 15 having a circular arcing cutting edge 15a at the side of the nose part 17 and a rectilinear cutting edge 15b merging with the cutting edge 15a via a first bending part 15. The second cutting edge 16 having two rectilinear cutting edges 16a and 16b merging via a second bending part 16c.

Each of the tips used in '703 is disposed differently with respect to the tool since each of the cutting edges has different characteristics. Since the cutting edges are arranged in 180° rotational symmetry, each tip can be indexed only two times at its pocket. Furthermore, if the tips used in '703 are used to perform ramp-down milling they are not properly supported against radially outwardly directed cutting forces that tend to withdraw each tip out of its pocket.

Japanese Publication No. 2000-005921 to Yoshimitsu shows, in FIG. 4 thereof, a three-corner cutting insert. Each of the three cutting edges comprises a small curved cutting edge portion 7 and a large straight cutting edge portion 8. The cutting insert of '921 does not have a cutting edge specifically designed for performing ramp-down milling. Furthermore, the cutting insert is not properly supported against radially outwardly directed cutting forces that tend to withdraw the cutting insert out of its pocket during a ramp-down milling operation.

Another kind of tool, having means for preventing rotation of the cutting insert around the axis of the clamping screw, is shown in European Patent No. EP 0 091 408 B1 to Bylund. In '408 there is disclosed a cutting insert 12 having three convex cutting edges 16, 17 and 18. Each of the cutting edges is connected, at a rear end thereof, to an auxiliary cutting edge 32, which extends transversely to the cutting edge and forms an obtuse angle therewith. The auxiliary cutting edge 32 is intended to cut the workpiece during reversed relative movement between the insert and the workpiece. The cutting edges of the cutting insert 12 are not peripherally continuous around the top face of the cutting insert. Instead, they are separated by an intermediate peripheral space 24, 25 and 26. The cutting insert 12 is not provided with a cutting edge for performing ramp-down milling operations and is not especially supported against radially outwardly directed cutting forces that tend to withdraw the cutting insert out of its pocket. For preventing rotation of the cutting insert, the cutting insert is provided with a supporting surface 27 that is directed substantially towards the center of the cutting insert. The supporting surface 27 abuts against an abutment surface 28 on the tool body that fits into the intermediate peripheral surface.

A disadvantage of the tool of '408 is that in order to prevent rotation of the cutting insert, the cutting edges are formed with recesses which complicate and weaken the cutting insert.

It is an object of the present invention to provide a cutting tool and a cutting insert therefor that significantly reduce or overcome the aforementioned disadvantages.

SUMMARY OF THE INVENTION

In accordance with the present invention there is provided a cutting tool having a longitudinal axis, the cutting tool comprises a tool body, having at least one mounting leg formed at a front end thereof, the at least one mounting leg having an insert pocket with a cutting insert retained therein;

the insert pocket comprises a base wall and first and second rear sidewall sections transversely directed to the base wall, a generally circular recess extends downwardly from the base wall, the recess has a lower wall bounded by a peripheral wall extending uprightly from the lower wall to the base wall, the cutting insert comprises an upper surface, a lower surface and a side surface extending therebetween, the upper and side surfaces intersecting at a cutting edge, a cylindrical protrusion having a cylindrical peripheral surface extends downwardly from the lower surface to a bottom surface of the protrusion;

wherein the cutting insert is retained in the insert pocket with first, second and third abutment surfaces of the insert pocket abutting the cutting insert, where the first abutment surface is located on the first rear sidewall section and it abuts a first support surface located on the side surface of the cutting insert, the second abutment surface is located on the second rear sidewall section and it abuts a second support surface located on the side surface of the cutting insert, and the third abutment surface is located on the peripheral wall of the recess and it abuts a third support surface located on the cylindrical peripheral surface of the protrusion of the cutting insert.

In accordance with a preferred embodiment of the present invention, the cutting edge comprises at least three cutting edge portions that are separated from each other by corner cutting edges and each cutting edge portion comprises a first cutting edge that extends between a second cutting edge and an adjacent corner cutting edge.

Preferably, the first cutting edge is convex.

If desired, the second cutting edge is straight.

Further in accordance with a preferred embodiment of the present invention, the side surface comprises side surface sections with a first side surface section adjacent the first cutting edge, a second side surface section adjacent the second cutting edge and a side surface corner section adjacent the corner cutting edge, each of the side surface sections extending from its associated cutting edge towards the lower surface.

In accordance with a preferred embodiment, the first and second rear sidewall sections are separated by a first recessed region.

Further in accordance with a preferred embodiment, the first support surface and the second support surface are located on either side of a common side surface corner section.

Typically, a portion of the common side surface corner section is located in the first recessed region.

Preferably, the peripheral wall of the recess comprises a major portion having a major radius, and a minor portion having a minor radius.

Further preferably, the minor radius is smaller than the major radius.

Still further preferably, the angular extent of the minor portion is smaller than the angular extent of the major portion.

In accordance with a preferred embodiment, a threaded bore extends downwardly from the lower wall of the recess.

Typically, a through bore, having an insert axis, extends between the upper surface of the cutting insert and the bottom surface of the protrusion.

Further typically, a retaining screw is located in the through bore and threadingly engages the threaded bore.

In accordance with a specific embodiment of the present invention, first cutting edge subtends a first angle (α) of 70° with the insert axis.

Further in accordance with a specific embodiment of the present invention, the second cutting edge subtends a second angle (β) of 35° with the insert axis.

Typically, the first cutting edge forms an obtuse interior third angle (γ) with the adjacent second cutting edge.

In accordance with a specific embodiment of the present invention, the third angle is 153°.

Also in accordance with the present invention there is provided a cutting insert, comprising an upper surface, a lower surface; and a side surface extending between the upper and lower surfaces with the upper and side surfaces intersecting at a cutting edge; a cylindrical protrusion having a cylindrical peripheral surface extending downwardly from the lower surface to a bottom surface of the protrusion, the cutting insert having an insert axis passing through the upper and bottom surfaces;

wherein the cutting edge comprises at least three cutting edge portions that are separated from each other by corner cutting edges, each cutting edge portion comprising a first convex cutting edge that extends between a second cutting edge and an adjacent corner cutting edge.

If desired, the second cutting edge is straight.

In accordance with a specific embodiment of the present invention, first cutting edge subtends a first angle (α) of 70° with the insert axis.

Further in accordance with a specific embodiment of the present invention, the second cutting edge subtends a second angle (β) of 35° with the insert axis.

Typically, the first cutting edge forms therewith an obtuse interior third angle (γ) with the adjacent second cutting edge.

In accordance with a specific embodiment of the present invention, the third angle is 153°.

Typically, a through bore, having as axis the insert axis, extends between the upper surface of the cutting insert and the bottom surface of the protrusion.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 1:
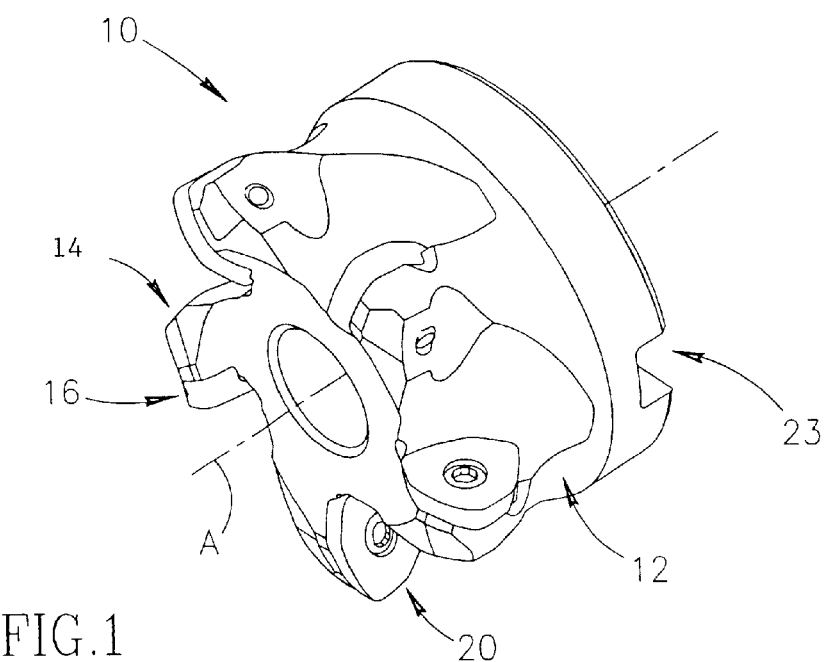
FIG. 1 is a perspective view of a cutting tool according to the present invention.
Figure 2:
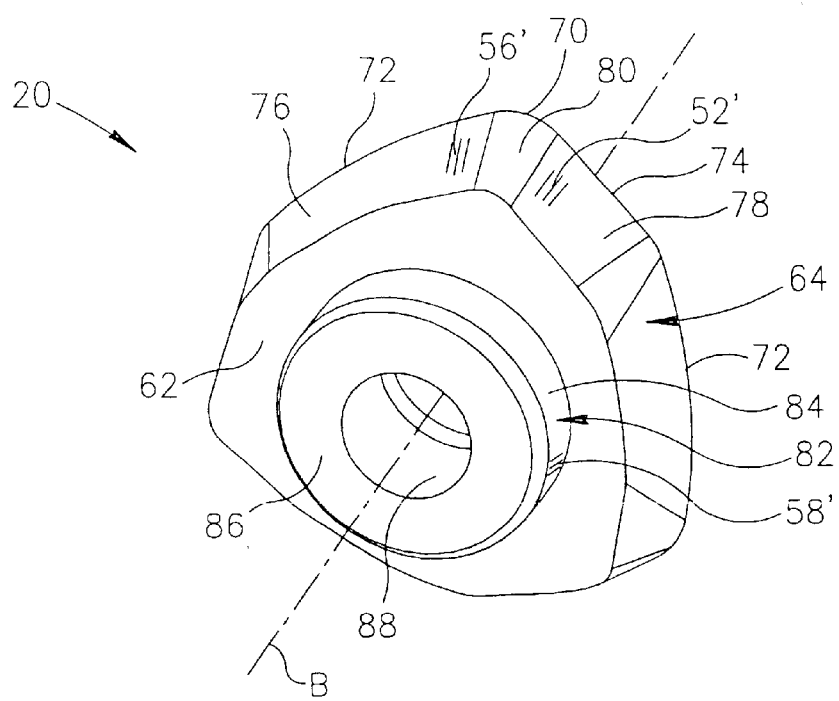
FIG. 2 is a bottom perspective view of a cutting insert shown in FIG. 1.
Figure 3:
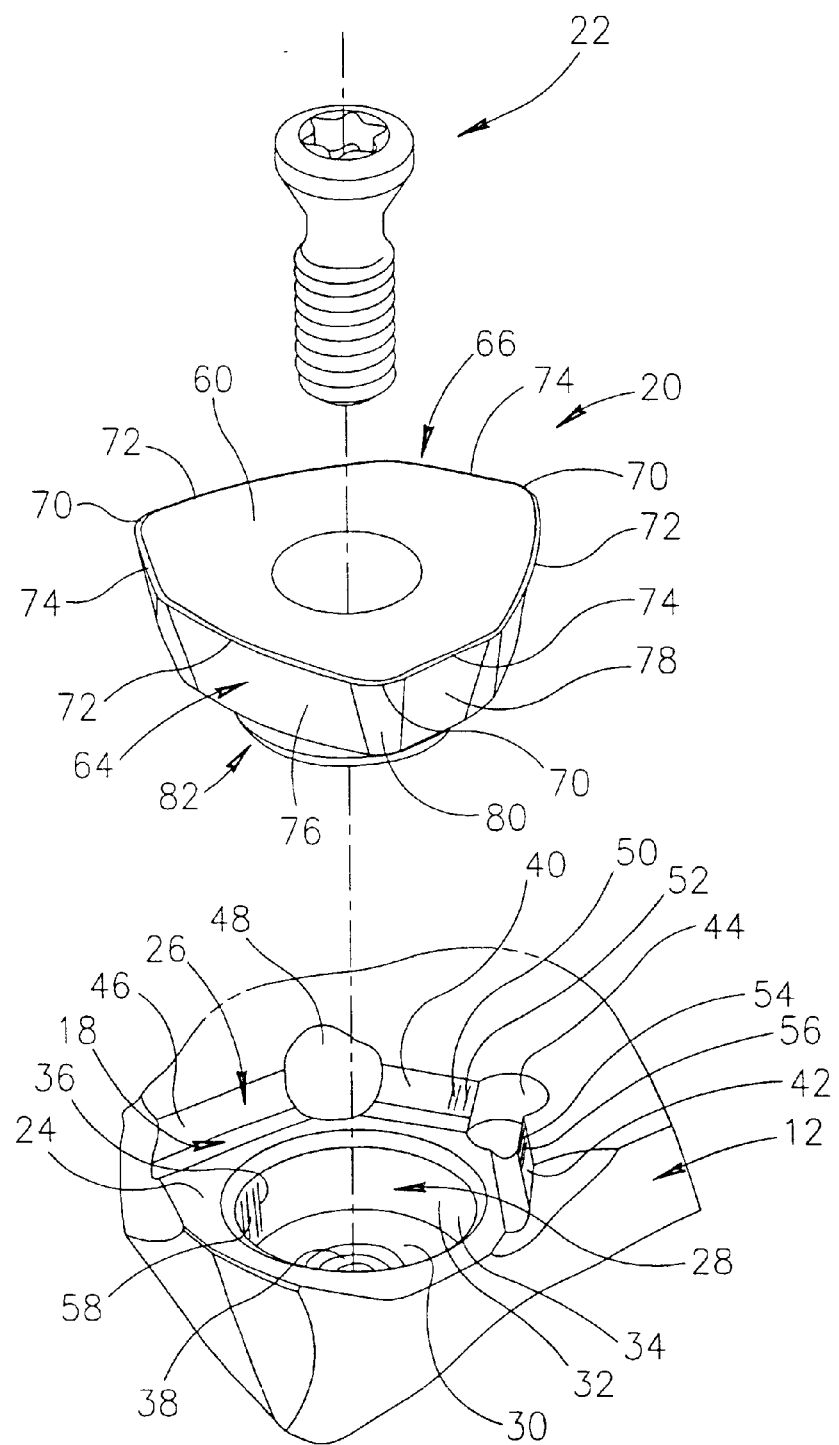
FIG. 3 is a partial exploded view of the cutting tool of FIG. 1 showing one of the cutting inserts removed from its pocket.
Figure 4:
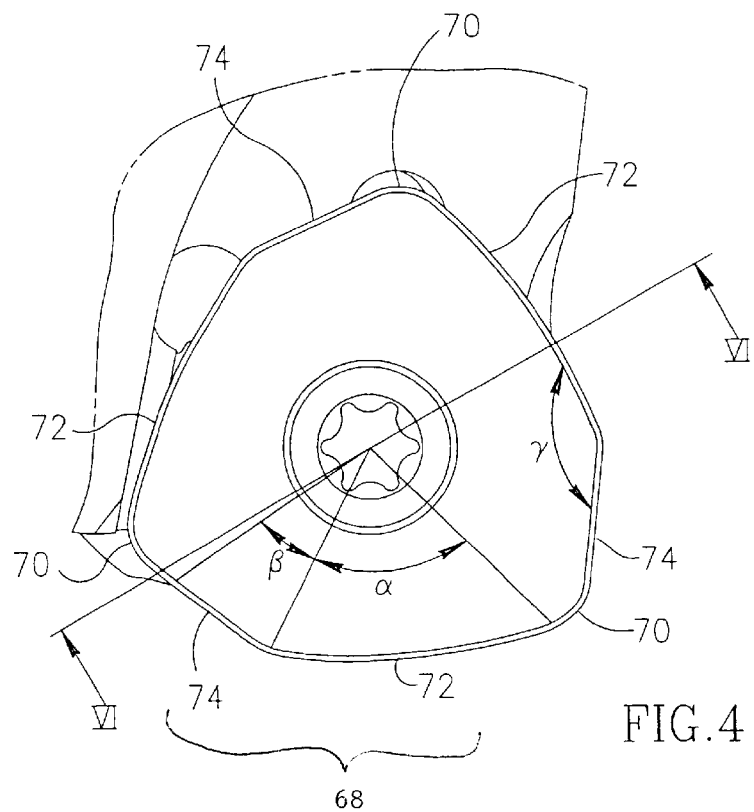
FIG. 4 is a partial view of the cutting tool of FIG. 1 showing a top view of one of the cutting inserts retained in its pocket.

Attention is drawn to the drawings. A cutting tool 10 comprises a tool body 12 having a plurality of mounting legs 14 formed at a front end 16 of the tool body 12. Each mounting leg 14 has an insert pocket 18 in which a cutting insert 20 is retained by means of a retaining screw 22. The cutting tool 10 has a rear end 23 opposite the front end 16 with an axis of rotation A passing through the front and rear ends 16, 23 defining a front to rear direction.

The insert pocket comprises a base wall 24 and a sidewall 26 that is transversely directed to the base wall 24. A generally circular recess 28 extends downwardly from the base wall 24. The recess 28 has a lower wall 30 bounded by a peripheral wall 32 extending uprightly from the lower wall 30 to the base wall 24. The peripheral wall 32 of the recess 28 preferably comprises two circular portions of differing radii, but having the same center. The peripheral wall 32 comprises a major portion 34 having a major radius R1, and a minor portion 36 having a minor radius R2. The minor radius R2 is smaller than the major radius R1. According to a specific application of the present invention, the minor radius R2 is 0.25 mm smaller than the major radius R1. The angular extent of the minor portion 36 is smaller than the angular extent of the major portion 34. In accordance with a specific application, the minor portion 36 of the peripheral wall 32 has an angular extent φ of approximately 40°. A threaded bore 38, having a pocket axis C, for receiving the retaining screw 22, extends downwardly from the lower wall 30 of the recess 28. The centers of the two circles on which the major and minor portions 34, 36 lie coincide with the axis C.

The sidewall 26 comprises three sidewall sections, two rear sidewall sections, a first rear sidewall section 40 and a second rear sidewall section 42 separated by a first recessed region 44 and a side sidewall section 46. The first rear sidewall section 40 is adjacent the side sidewall section 46 and separated from it by a second recessed region 48. The first rear sidewall section 40 has a region 50 adjacent the first recessed region 44, at least a portion of which constitutes a first abutment surface 52 for abutting the cutting insert 20. Similarly, the second rear sidewall section 42 has a region 54 adjacent the first recessed region 44, at least a portion of which constitutes a second abutment surface 56 for abutting the cutting insert 20. Also, at least a portion of the minor portion 36 constitutes a third abutment surface 58 for abutting the cutting insert 20. As will be explained in greater detail below, the first, second and third abutment surfaces are designed to retain the cutting insert 20 in the insert pocket 18 in a well defined and secure manner.

Figure 5:
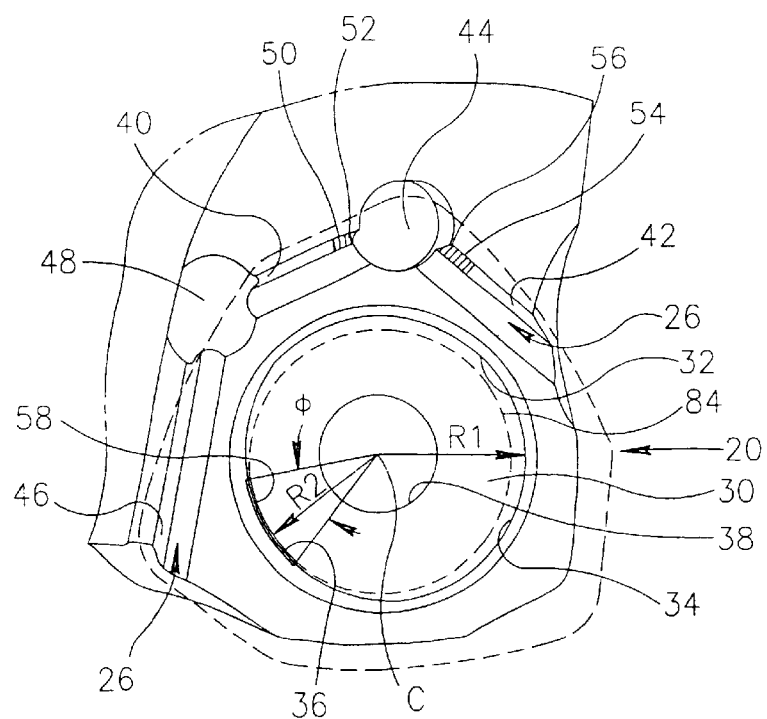
FIG. 5 is the same view as FIG. 4 with the position of the cutting insert shown in dashed lines so that the insert pocket can be seen in a top view.
Figure 6:
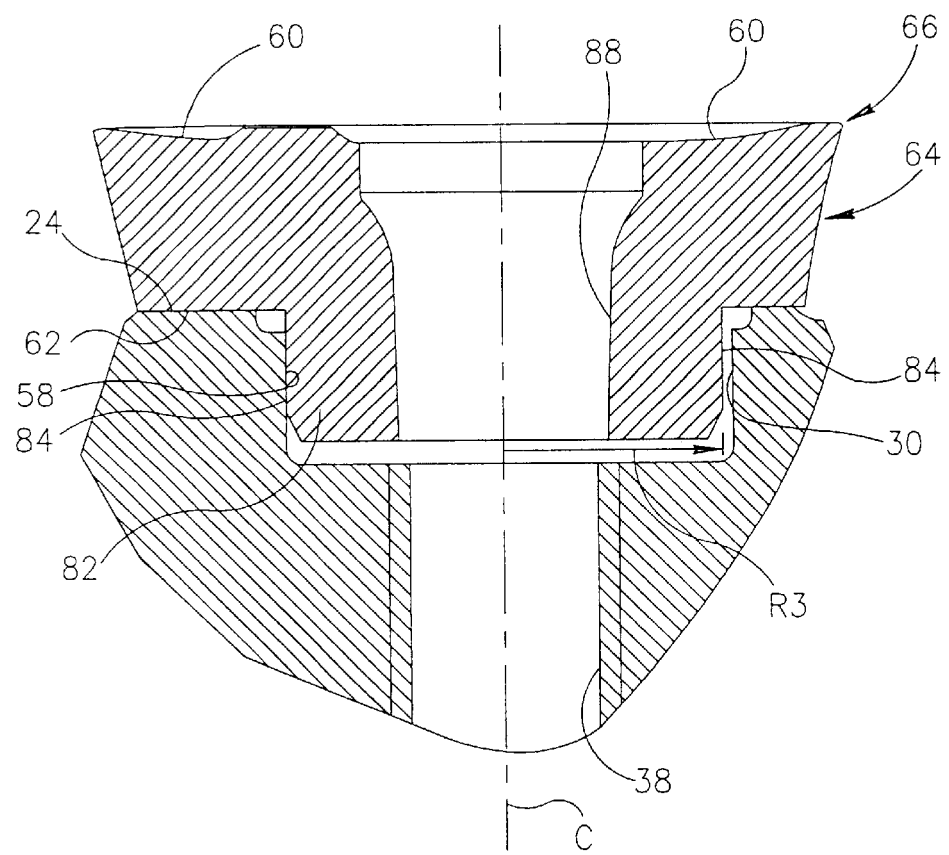
FIG. 6 is a cross-sectional view taken along line VI—VI in FIG. 4 with the retaining screw removed.

Attention is drawn to FIG. 5. It will be noted that the minor portion 36, and therefore the third abutment surface 58, is located adjacent the side sidewall 46 towards the front of the insert pocket 18. In terms of an analog clock, the minor portion is located approximately between 7 and 8 o'clock. It will be appreciated that the precise location of the minor portion 36 is a question of design and distribution of forces. In practice, the illustrated location of the minor portion 36 is a preferred location. However, it can also be located at other locations between the preferred location up to approximately adjacent the second recessed region 48.

The cutting insert 20 comprises an upper surface 60, a lower surface 62 and a side surface 64 that extends between the upper and lower surfaces 60, 62. The upper surface 60 and the side surface 64 intersect at a cutting edge 66 comprising three cutting edge portions 68 separated from each other by corner cutting edges 70. Each of the three cutting edge portions comprises a convex first cutting edge 72 that extends between a straight second cutting edge 74 and an adjacent corner cutting edge 70. The side surface 64 is divided into sections corresponding to the various cutting edges. Accordingly, the side surface 64 has a first side surface section 76 adjacent the first cutting edge 72, a second side surface section 78 adjacent the second cutting edge 74 and side surface corner section 80 adjacent corner cutting edge 70. A cylindrical protrusion 82 having a cylindrical peripheral surface 84 extends downwardly from the lower surface 62 to a bottom surface 86 of the protrusion 82. The peripheral surface 84 is perpendicular to the lower surface 62. A centrally located through bore 88, having an insert axis B, extends between the upper surface 60 and the bottom surface 86. The protrusion 82 has a protrusion radius R3. The protrusion radius R3 is smaller than the major radius R1 and approximately equal to the minor radius R2.

The three cutting edge portions 68 are rotationally symmetrically arranged with respect to the insert axis B. The first cutting edge 72 is substantially larger than the second cutting edge 74. According to a preferred embodiment of the present invention, the first cutting edge 72 subtends a first angle α of 70° at the insert axis B and the second cutting edge 74 subtends a second angle β of 35° at the insert axis B. The first and second cutting edges 72, 74 of a given cutting edge portion 68 make an obtuse interior third angle γ of 153° between each other. The cutting insert 20 is indexable and has three indexing positions.

In order to secure the cutting insert 20 in the insert pocket 18, the protrusion 82 is inserted into the recess 28 until the lower surface 62 of the cutting insert abuts the base wall 24 of the insert pocket, with a portion of a given side surface corner section 80 located in the first recessed region 44. The retaining screw 22 is then placed in the through bore 88 of the cutting insert and threadingly engaged with the threaded bore 38 and tightened for securely retaining the cutting insert in the insert pocket 18. When the cutting insert 20 is securely retained in the insert pocket 18 the first and second abutment surfaces 52, 56 abut the first and second side surface sections 76, 78 located on either side of the given side surface corner 80, being common to the first and second side surface sections 76, 78, at first and second support surfaces 52', 56', respectively and the third abutment surface 58 abuts the cylindrical peripheral surface 84 of the protrusion 82 at a third support surface 58'.

The pocket axis C of the threaded bore 38 is slightly offset with respect to the insert axis B. This offset, i.e., eccentricity, is provided so that when the retaining screw 22 is tightened, abutment forces are exerted by the abutment surfaces 52, 56, 58 on the cutting insert providing a pre-tensioning of the cutting insert 20 in order to obtain a well defined location of the cutting insert 20 in the insert pocket 18. Since the third abutment surface 58 lies on a surface which is concentric with the pocket axis C the abutment force applied by it on the protrusion 82 of the cutting insert is directed towards the insert axis B and therefore cannot contribute to the rotation of the cutting insert about the insert axis B. The location and direction of each of the first and second abutment surfaces 52, 56 are designed so that under working conditions net abutment force applied by these abutments surfaces to the side surface 64 of the insert does not give rise to rotation of the cutting insert about the insert axis B. In other words, the lines of action of the abutment forces of the first and second abutment surfaces 52, 56 operate in opposite senses about the insert axis B and cancel out. Hence, the present invention guarantees unique and stable location of the cutting insert 20 in the insert pocket 18.

The cutting tool 10 is particularly suitable for performing face milling by the first cutting edge 72 and ramp-down milling operations by the second cutting edge 74. Since the first cutting edge 72 is convex and has a relatively large radius of curvature, the cutting insert 20 can cut at a relatively high feed speed at a small depth of cut. The cutting forces acting on the cutting insert in such a case are directed substantially axially, therefore, it is possible to cut with a tool having a relatively long overhang without exceeding the allowed radial forces that tend to bend the tool and cause vibrations.

Although the present invention has been described to a certain degree of particularity, it should be understood that various alterations and modifications could be made without departing from the spirit or scope of the invention as hereinafter claimed.

What is claimed is:

1. A cutting tool having a longitudinal axis (A), the cutting tool comprising:

a tool body having at least one mounting leg formed at a front end thereof, the at least one mounting leg having an insert pocket with a cutting insert retained therein, the insert pocket comprising a base wall and first and second rear sidewall sections transversely directed to the base wall, a generally circular recess extending downwardly from the base wall, the recess having a lower wall bounded by a peripheral wall extending uprightly from the lower wall to the base wall;

the cutting insert comprising an upper surface, a lower surface and a side surface extending therebetween, the upper and side surfaces intersecting at a cutting edge, a cylindrical protrusion having a cylindrical peripheral surface extending downwardly from the lower surface to a bottom surface of the protrusion, the cutting insert having first and second support surfaces located on the side surface of the cutting insert, and a third support surface located on the cylindrical peripheral surface of the protrusion of the cutting insert;

wherein:

the cutting insert is retained in the insert pocket with first, second and third abutment surfaces of the insert pocket abutting the cutting insert;

the first abutment surface is located on the first rear sidewall section and abuts the first support surface;

the second abutment surface is located on the second rear sidewall section and abuts the second support surface; and the third abutment surface is located on the peripheral wall of the recess and abuts the third support surface.

2. The cutting tool according to claim 1, wherein the cutting edge comprises at least three cutting edge portions that are separated from each other by corner cutting edges and each cutting edge portion comprises a first cutting edge that extends between a second cutting edge and an adjacent corner cutting edge.

3. The cutting tool according to claim 2, wherein the first cutting edge is convex.

4. The cutting tool according to claim 3, wherein the second cutting edge is straight.

5. The cutting tool according to claim 2, wherein the side surface comprises side surface sections with a first side surface section adjacent the first cutting edge, a second side surface section adjacent the second cutting edge and a side surface corner section adjacent the corner cutting edge, each of the side surface sections extending from its associated cutting edge towards the lower surface.

6. The cutting tool according to claim 5, wherein the first and second rear sidewall sections are separated by a first recessed region.

7. The cutting tool according to claim 6, wherein the first support surface and the second support surface are located on either side of a common side surface corner section.

8. The cutting tool according to claim 7, wherein a portion of the common side surface corner section is located in the first recessed region.

9. The cutting tool according to claim 4, wherein the peripheral wall of the recess comprises a major portion having a major radius, and a minor portion having a minor radius.

10. The cutting tool according to claim 9, wherein the minor radius is smaller than the major radius.

11. The cutting tool according to claim 10, wherein the angular extent of the minor portion is smaller than the angular extent of the major portion.

12. The cutting tool according to claim 11, wherein a threaded bore extends downwardly from the lower wall of the recess.

13. The cutting tool according to claim 12, wherein a through bore, having an insert axis, extends between the upper surface of the cutting insert and the bottom surface of the protrusion.

14. The cutting tool according to claim 13, wherein a retaining screw is located in the through bore and threadingly engages the threaded bore.

15. The cutting tool according to claim 13, wherein first cutting edge subtends a first angle ($\alpha$) of 70° with the insert axis.

16. The cutting tool according to claim 15, wherein the second cutting edge subtends a second angle ($\beta$) of 35° with the insert axis.

17. The cutting tool according to claim 16, wherein the first cutting edge forms an obtuse interior third angle ($\gamma$) with the adjacent second cutting edge.

18. The cutting tool according to claim 17, wherein the third angle is 153°.

19. A cutting insert comprising:
   an upper surface,
   a lower surface; and
   a side surface extending between the upper and lower surfaces with the upper and side surfaces intersecting at a cutting edge;
   a cylindrical protrusion having a cylindrical peripheral surface extending downwardly from the lower surface to a bottom surface of the protrusion, the cutting insert having an insert axis passing through the upper and bottom surfaces;
   wherein the cutting edge comprises at least three cutting edge portions that are separated from each other by corner cutting edges, each cutting edge portion comprising a first convex cutting edge that extends between a second cutting edge and an adjacent corner cutting edge.

20. The cutting insert according to claim 19, wherein the second cutting edge is straight.

21. The cutting insert according to claim 20, wherein first cutting edge subtends a first angle ($\alpha$) of 70° with the insert axis.

22. The cutting insert according to claim 21, wherein the second cutting edge subtends a second angle ($\beta$) of 35° with the insert axis.

23. The cutting insert according to claim 22, wherein the first cutting edge forms therewith an obtuse interior third angle ($\gamma$) with the adjacent second cutting edge.

24. The cutting insert according to claim 23, wherein the third angle is 153°.

25. The cutting insert according to claim 24, wherein a through bore, having as axis the insert axis, extends between the upper surface of the cutting insert and the bottom surface of the protrusion.

26. A cutting tool having a longitudinal axis (A), the cutting tool comprising:
   a tool body having at least one mounting leg formed at a front end thereof, the at least one mounting leg having an insert pocket,
   the insert pocket comprising a base wall and first and second rear sidewall sections transversely directed to the base wall, a recess extending downwardly from the base wall, the recess having a lower wall bounded by a peripheral wall extending uprightly from the lower wall to the base wall, a threaded bore extending downwardly from the lower wall of the recess; and
   a three-way indexable cutting insert comprising an upper surface, a lower surface and a side surface extending therebetween, the upper and side surfaces intersecting at a cutting edge, and a protrusion having a peripheral surface extending downwardly from the lower surface to a bottom surface of the protrusion, the cutting insert having first and second support surfaces located on the side surface of the cutting insert, and a third support surface located on the peripheral surface of the protrusion;
   wherein:
      the cutting insert is retained in the insert pocket with first, second and third abutment surfaces of the insert pocket abutting the cutting insert;
      the first abutment surface is located on the first rear sidewall section and abuts the first support surface;
      the second abutment surface is located on the second rear sidewall section and abuts the second support surface; and
      the third abutment surface is located on the peripheral wall of the recess and abuts the third support surface.

27. The cutting tool according claim 26, wherein the recess is circular and the protrusion and the peripheral surface are cylindrical.

28. A three-way indexable cutting insert comprising:
   an upper surface,
   a lower surface; and
   a side surface extending between the upper and lower surfaces with the upper and side surfaces intersecting at a cutting edge;
   a protrusion having a peripheral surface extending downwardly from the lower surface to a bottom surface of the protrusion, the cutting insert having an insert axis passing through the upper and bottom surfaces;
   wherein the cutting edge comprises three cutting edge portions that are separated from each other by corner cutting edges, each cutting edge portion comprising a first convex cutting edge that extends between a second cutting edge and an adjacent corner cutting edge.

29. The three-way indexable cutting insert according to claim 28, wherein the protrusion and the peripheral surface are cylindrical.

* * * * *